(12) United States Patent
Annear

(10) Patent No.: US 6,505,723 B1
(45) Date of Patent: Jan. 14, 2003

(54) MULTI-DISC CLUTCH SEPARATOR PLATE

(75) Inventor: Graham M. Annear, Farmington Hills, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/925,931

(22) Filed: Aug. 9, 2001

(51) Int. Cl.[7] .............................................. F16D 13/72
(52) U.S. Cl. ................... 192/70.12; 192/113.3
(58) Field of Search ......................... 192/70.12, 107 R, 192/113.36, 113.3, 113.34, 113.26; 188/71.6, 264 B, 264 D, 264 A

(56) References Cited

U.S. PATENT DOCUMENTS

| | | | | |
|---|---|---|---|---|
| 1,453,599 A | * | 5/1923 | Parker ..................... | 188/264 D |
| 1,635,353 A | * | 7/1927 | Alley ...................... | 192/107 R |
| 2,260,869 A | * | 10/1941 | Ruesenberg ............ | 192/107 R |
| 3,730,304 A | * | 5/1973 | Buyze ...................... | 188/71.6 |
| 3,841,452 A | * | 10/1974 | Newsock et al. ....... | 192/107 R |
| 4,560,048 A | | 12/1985 | Flotow et al. | |
| 4,878,282 A | | 11/1989 | Bauer | |
| 4,989,709 A | * | 2/1991 | Takeuchi ................ | 192/70.12 |
| 5,029,686 A | | 7/1991 | Yesnik | |
| 5,048,654 A | | 9/1991 | Yesnik | |
| 5,240,095 A | * | 8/1993 | Shimamura et al. ..... | 192/70.12 |
| 5,678,675 A | * | 10/1997 | Dover et al. ............ | 192/107 R |
| 5,688,176 A | | 11/1997 | Heidenreich et al. | |
| 5,934,435 A | | 8/1999 | Bauer | |
| 6,189,669 B1 | | 2/2001 | Kremer et al. | |
| 6,352,147 B1 | * | 3/2002 | Orlamunder et al. ... | 192/107 R |
| 6,360,864 B1 | * | 3/2002 | Thomas et al. ......... | 192/107 R |

FOREIGN PATENT DOCUMENTS

WO    WO 94/09284 A1   *   4/1994

* cited by examiner

*Primary Examiner*—Rodney H. Bonck
(74) *Attorney, Agent, or Firm*—Emch, Schaffer, Schaub & Porcello, Co., L.P.A.

(57) ABSTRACT

A separator plate assembly for a multi-disc clutch has first and second spaced apart plates welded to wire elements positioned therebetween. The wire elements are spaced apart and cooperate with the first and second plates to define generally radially inwardly/outwardly extending flow paths for lubricating/cooling oil. A template is provided for use in assembling the wire elements to the plates.

11 Claims, 5 Drawing Sheets

MULTI-DISC CLUTCH SEPARATOR PLATE

TECHNICAL FIELD

The present invention is directed to a hollow clutch separator plate assembly having a design to permit cooling/lubricating oil to pass radially therethrough.

BACKGROUND OF THE INVENTION

Multi-disc assemblies for use with clutch assemblies in automatic transmissions are well known in the art. Various types of arrangements and constructions have been utilized in order to provide paths for the cooling/lubricating oil to flow therethrough to prevent damage to the assembly. One such type of disc assembly with a grooved cooling layer is shown in U.S. Pat. No. 5,934,435, assigned to the assignee of the present invention, the disclosure of which is incorporated herein by reference.

SUMMARY OF THE INVENTION

According to the present invention, the separator plate assembly has a pair of spaced-apart separator plate members which are separated by a plurality of wire forms. The wire forms are spaced-apart and arranged to permit the lubricating oil to flow in a generally radial direction in the spaces defined by adjacent wire forms and the two thin separator plate members. The separator plate members are bonded to the wire forms, preferably by welding, such as by a capacitor discharge welding process.

IN THE DRAWINGS

DETAILED DESCRIPTION OF THE INVENTION

Figure 1:
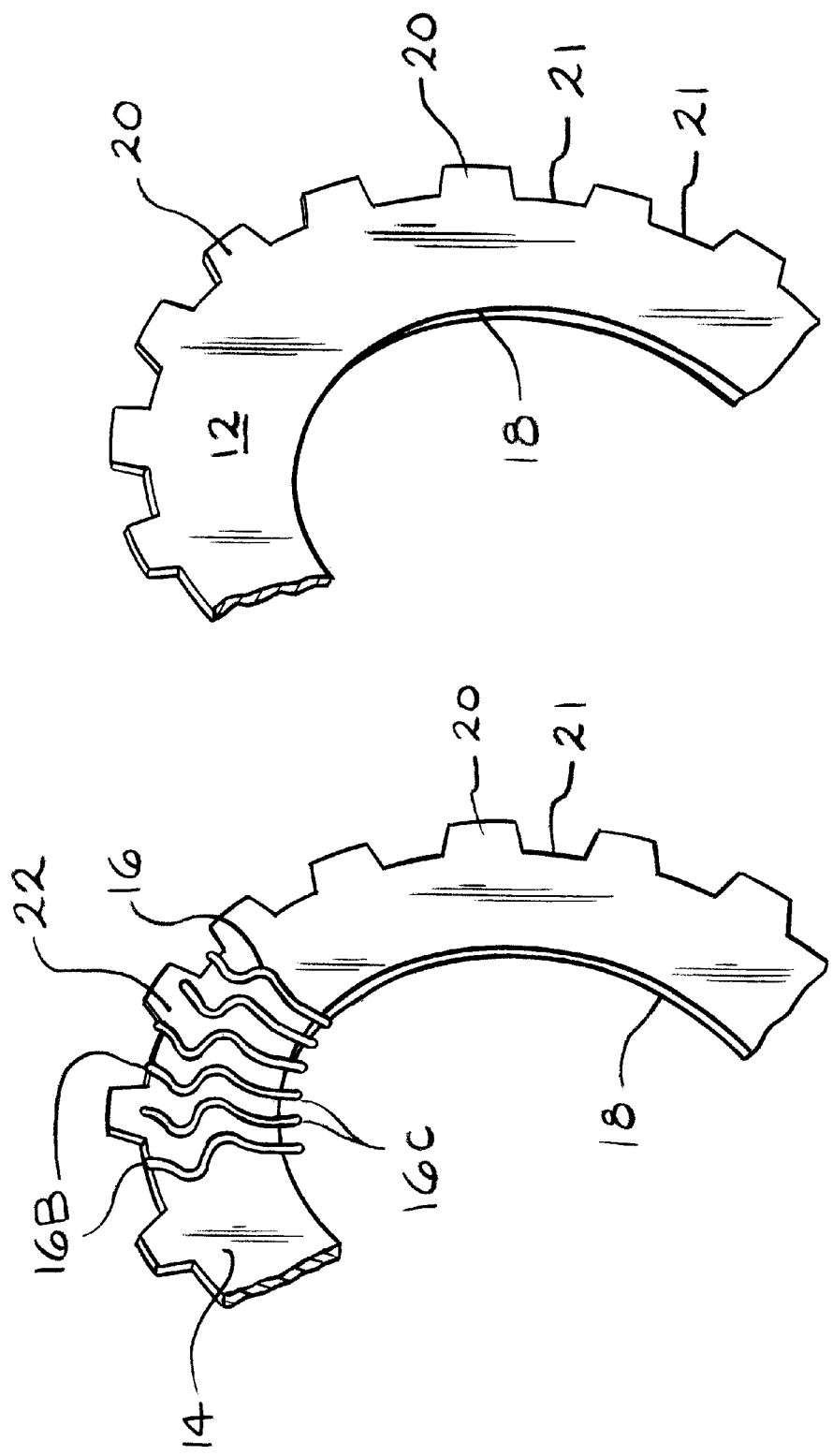
FIG. 1 is an exploded fragmentary perspective view of the separator plate assembly of the present invention.
Figure 2:
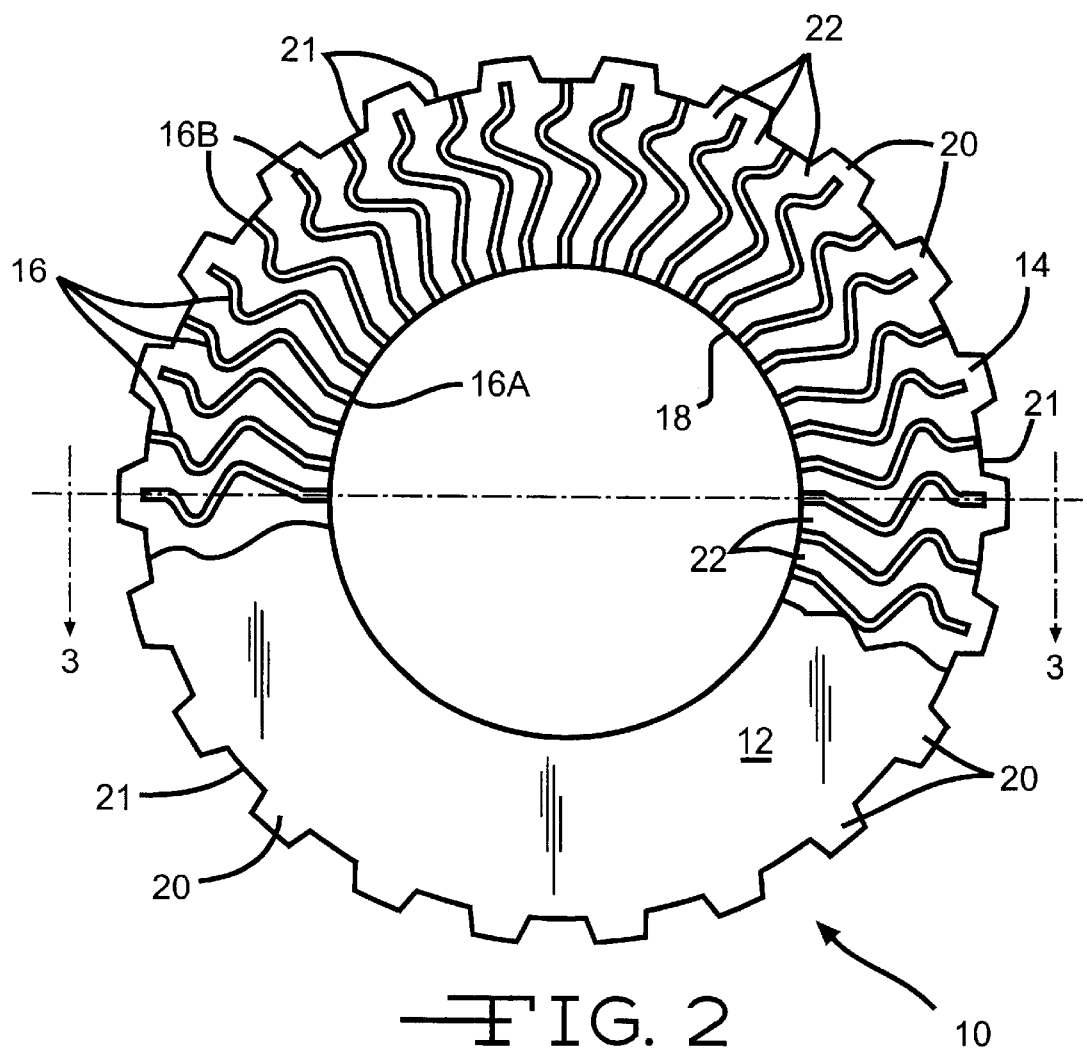
FIG. 2 is a plan view of the separator plate assembly of the present invention.
Figure 3:
FIG. 3 is a sectional view taken through line 3—3 of FIG. 2.

Referring to FIGS. 1 through 3, there is shown a separator plate assembly generally designated by the numeral 10 comprising a first plate 12, a second plate 14 disposed in spaced-apart relationship with the first plate 12 and a plurality of formed wire forms/wire elements 16 between the first plate 12 and second plate 14. In FIG. 2 the first plate 12 has been broken away.

The first plate 12 and the second plate 14 are formed of metal, usually steel, and as viewed in plan, each defines a generally circular configuration with an inner edge 18 defining a circle and a plurality of identical radially outwardly extending teeth 20 at their outer periphery. As is well known in the art, the teeth 20 are engageable with a gear member (not shown) of the clutch. Spaced apart grooves 21 are between the teeth 20 and cooperate with the teeth 20 to define an outer edge.

The wire elements 16 may have a circular cross sectional configuration in the range of 0.5 to 10.0 millimeters (mm) diameter and preferably in the range of 0.75 to 5.0 mm and most preferably in the range of 1.0 to 1.5 mm. However, they could have a square or other cross sectional configuration. If the wire elements 16 have a square or other rectangular cross-sectional configuration, each side in the case of square or short side in the case of other rectangular may be in the range of 0.5 to 10.0 mm and preferably in the range of 0.75 to 5.0 mm and most preferably in the range of 1.0 to 1.5 mm. Preferably the wire elements 16 are formed of metal such as steel and are welded to the inwardly facing surfaces respectively of the first plate 12 and the second plate 14. If the wire elements 16 are formed of a material which is unable to be welded to the plates 12, 14, they may be adhered to the inwardly facing surfaces by any suitable adhering medium.

The wire elements 16 preferably have a non-linear shape as viewed in plan when assembled to the plates 12, 14 and are spaced-apart to define therebetween, in cooperation with the inwardly facing surfaces of the first plate 12 and the second plate 14, a plurality of generally radially extending flow passages 22 for the flow of cooling/lubricating oil. The wire elements 16 extend from an inner end 16A at the inner edge 18 of each of the first and second plates 12, 14 generally radially outwardly to a second or outer end 16B in the area of the teeth 20 and grooves 21. Although the wire elements 16 could follow a straight line path, it has been found that more effective cooling is achieved by providing flow passages 22 following a serpentine flow path resulting from the wire elements 16 having a non-linear serpentine shape.

Figure 4:
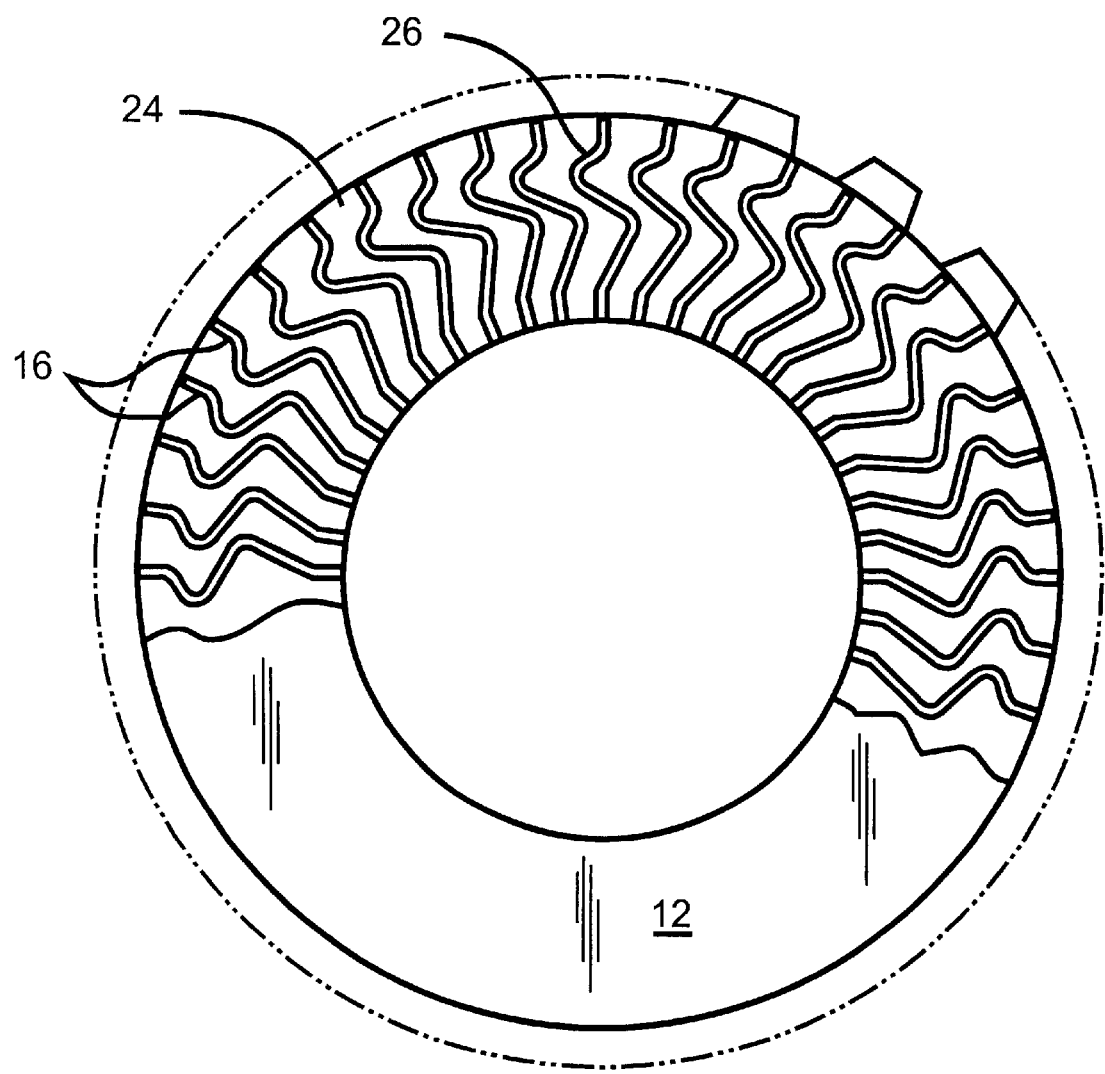
FIG. 4 is a plan view showing a template for use in engaging the wire forms to one of the separator plates.

In order to efficiently assemble the wire elements preparatory to welding or otherwise affixing them to the first and second plates 12, 14, it is desireable to utilize a template 24 having slots 26 sized and shaped to receive the wire elements 16. With the wire elements 16 positioned in the slots 26, the template 24 is positioned below the first plate 12 (broken away in FIG. 4) and moved upwardly so that the wire elements 16 are brought into contact with the interior surface of such first plate 12. The wire elements 16 protude out of the slots 26 so that their upper portions are slightly above the face the template 24 adjacent each of the slots 26. When so positioned, the adjoined first plate 12 and wire elements 16 are subjected to a welding process such as capacitor discharge welding, to weld such wire elements 16 to the surface of the adjoined first plate 12. The template 24 may then be removed, the second plate 14 moved into contact with the wire elements 16 and the welding process repeated to affix the second plate 14 to each of the wire elements 16.

When positioned in the template 24, the wire elements 16 may extend radially inwardly beyond the inner edges 18 of the first plate 12 and second plate 14 forming extensions adjacent the innermost ends 16C (see FIG. 1) which may be removed in a separate operation such as by stamping, for example. This completes the separator plate assembly 10 which is then ready for assembly in a clutch.

Figure 5:
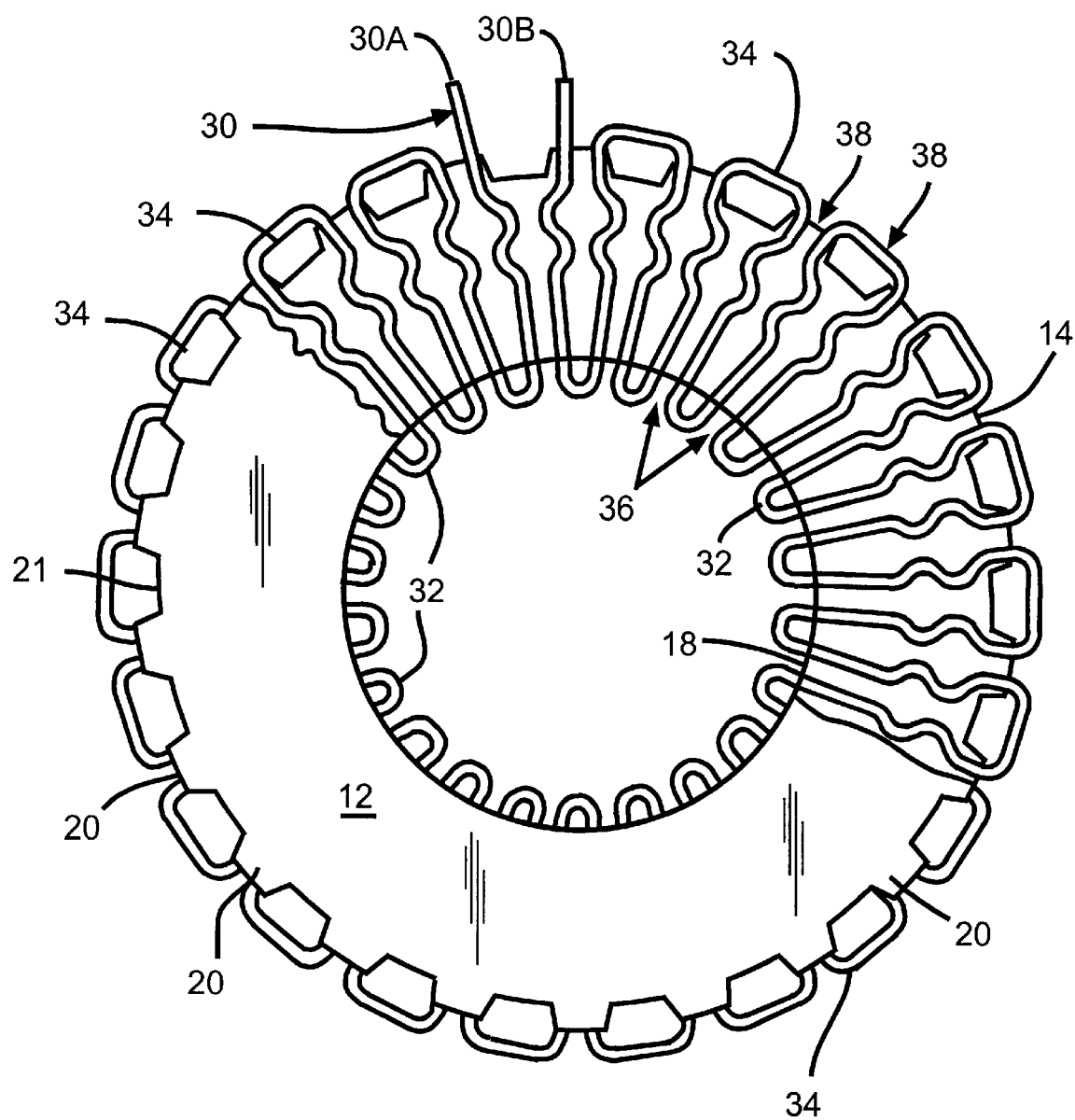
FIG. 5 is a plan view of a modified embodiment.

Referring now to FIG. 5, there is shown a modified embodiment in which the wire elements separating and joined to the first plate 12 and second plate 14 maybe stamped from a single length of wire 30 which is positioned between the first plate 12 (partially broken away in FIG. 5) and second plate 14 and then welded to such first and second plates 12, 14. As shown in FIG. 5, the wire length 30 has a first end 30A and a second end 30B. The wire length 30 follows a tortuous path from the first end 30A to the second end 30B. The wire length 30 defines a plurality of serpentine paths each extending from a position radially outwardly beyond the teeth 20 to form outer extensions 34 to a position radially inwardly beyond the inner edge 18 to form inner extensions 32. Following welding of the wire length 30 to the first and second plates 12, 14, the inner extensions 32 and outer extensions 34 maybe removed by stamping or other processes. As can be seen in FIG. 5, removal of such inner extensions 32 and outer extensions 34 forms disparate wire elements 40 and provides a plurality of first flow passages 36 having one shape and second flow passages 38 having a slightly different shape, but with each set of flow passages 36 and 38 extending generally radially between the inner edges 18 of the plates 12, 14 and the outer periphery defined by the teeth 20 and the spaces therebetween.

Figure 6:
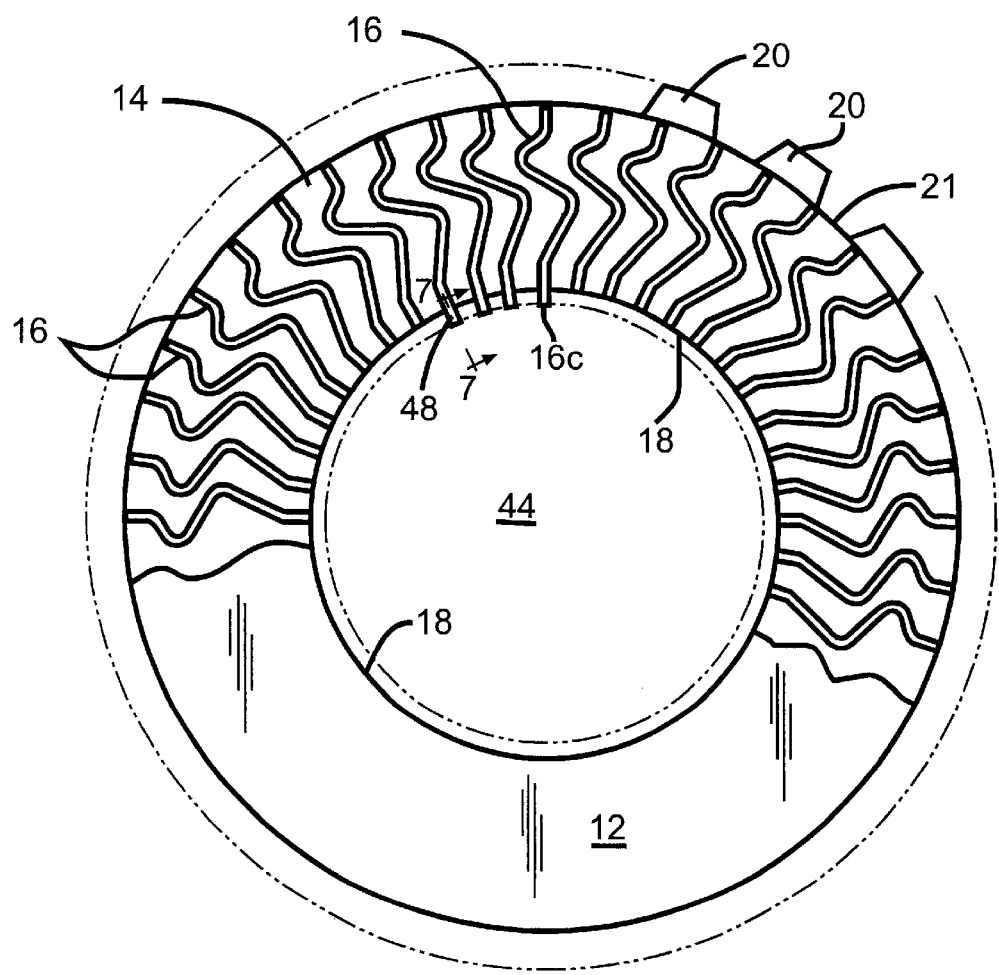
FIGS. 6–8 show a modified template and method for assembling.
Figures 7, 8:
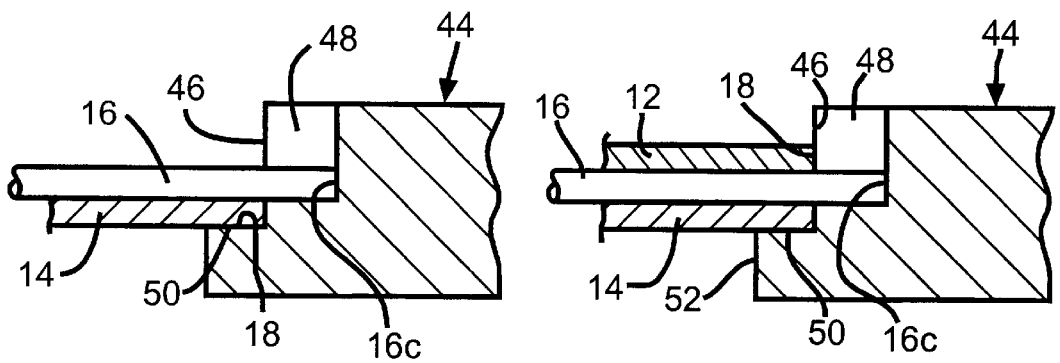

Referring to FIGS. 6, 7, and 8, there is shown preferred apparatus and method for assembling and welding the wire elements 16 to the first and second plates 12 and 14. According to this embodiment, there is provided a template 44 having an upper section defining a cylindrical wall 46 having a diameter slightly less than the diameter defined by the inner edges 18 of the first plate 12 and second plate 14. The template 44 is provided with a plurality of slots 48 extending radially inwardly from the cylindrical wall 46. The slots 48 extend radially inwardly from the cylindrical wall 46 approximately 6 to 10 millimeters and have a breadth to snugly receive the innermost ends 16C and adjacent portions of the wire elements 16, with one wire element 16 in each slot. A shoulder 50 in the lower portion of the template 44 extends radially outwardly from the cylindrical wall 46. A second cylindrical wall 52 extends downwardly from the radial shoulder 50 and has a diameter greater than the diameter of the inner edges 18 of the first and second plates 12 and 14.

In assembling the wire elements 16, the first cylindrical wall 46 of the template 44 is telescoped into the opening defined by the inner edge 18 of the lower or second plate 14. The second plate 14 thus rests upon the radial shoulder 50. With the second plate 14 thus supported, the wire elements 16 are then positioned with one wire element in each slot 48 and extending outwardly toward the outer edge defined by the teeth 20 and grooves 21. Following such positioning of the wire elements 16, the first plate 12 is then positioned over the template 44 with the cylindrical wall 46 of the template positioned within the opening defined by the inner edge 18 of the first plate 12. The assembled first and second plates 12 and 14 and wire elements 16 are then subjected to a welding process such as capacitor discharge welding to weld such wire elements 16 to the respective inwardly facing surfaces of the first and second plates 12 and 14. The innermost ends 16C and adjacent portions of the wire elements 16 forming extensions inwardly of the inner edges 18 may then be removed as by stamping.

The separator plate assembly of the present invention may be used with a wide variety of brake or clutch assemblies including a multi-disk friction device of the type disclosed in U.S. Pat. No. 6,189,669, incorporated herein by reference.

Many modifications will be readily apparent to those skilled in the art. Accordingly, the scope of this invention should be determined solely by the scope of the appended claims.

I claim:

1. A clutch separator plate assembly (10) comprising (a) a first separator plate (12) having a generally circular configuration, interior and exterior surfaces, an inner edge (18), and an outer edge (20, 21) radially outwardly from said inner edge (18);

(b) a second separator plate (14) having a generally circular configuration, an interior surface facing said first separator plate (12) interior surface, an exterior surface, an inner edge (18) and an outer edge (20, 21); and (c) a plurality of wire elements (16, 40) positioned between said first (12) and second (14) separator plates and affixed to the first separator plate (12) interior surface and to the second separator plate (14) interior surface, said wire elements (16, 40) being arranged in spaced-apart relationship to one another and cooperating with one another and with said first separator plate interior surface and said second separator plate interior surface to define a plurality of fluid flow passages (22, 36, 38) extending outwardly from said inner edges (18).

2. A clutch separator plate assembly according to claim 1 wherein said fluid flow passages (22, 36, 38) extend between said inner edges (18) and said outer edges (20, 21).

3. A clutch separator plate assembly according to claim 1 wherein said fluid flow passages (22, 36, 38) follow a non-linear path.

4. A clutch separator plate assembly according to claim 1 wherein said fluid flow passages (22, 36, 38) follow a serpentine path.

5. A clutch separator plate assembly according to claim 1 wherein said wire elements (16, 40) are welded or otherwise adhered to said first separator plate (12) and to said second separator plate (14).

6. A clutch separator plate assembly according to claim 1 wherein said wire elements have a circular cross-section with a diameter in the range of 0.5 to 10.0 mm.

7. A clutch separator plate assembly according to claim 6 wherein said wire elements have a diameter in the range of 0.75 to 5.0 mm.

8. A clutch separator plate assembly according to claim 6 wherein said wire elements have a diameter in the range of 1.0 to 1.5 mm.

9. A clutch separator plate assembly according to claim 1 wherein said wire elements have a square or other rectangular cross-sectional configuration having a side in the range of 0.5 to 10.0 mm.

10. A clutch separator plate assembly according to claim 9 wherein said side of said wire elements is in the range of 0.75 to 5.00 mm.

11. A clutch separator plate assembly according to claim 9 wherein said side of said wire elements is in the range of 1.0 to 1.5 mm.

* * * * *